United States Patent
Robinson et al.

[15] 3,700,749
[45] Oct. 24, 1972

[54] DEHYDROGENATION PROCESS OVER PLATINUM ON LITHIATED MORDENITE

[72] Inventors: John K. Robinson, Houston, Tex.; Hervey H. Voge, Berkeley, Calif.

[73] Assignee: Shell Oil Company, New York, N.Y.

[22] Filed: June 24, 1971

[21] Appl. No.: 156,494

[52] U.S. Cl.................................260/683.3, 252/464
[51] Int. Cl................................................C07c 5/18
[58] Field of Search....................260/683.3; 252/464

[56] References Cited

UNITED STATES PATENTS

| | | |
|---|---|---|
| 3,527,836 | 9/1970 | Turner et al............260/683.3 |
| 3,360,586 | 12/1967 | Bloch et al..............260/683.3 |
| 3,291,755 | 12/1966 | Haensel et al. ............252/464 |
| 3,649,565 | 3/1972 | Wilhelm....................252/466 |

*Primary Examiner*—Delbert E. Gantz
*Assistant Examiner*—J. Nelson
*Attorney*—John M. Duncan et al.

[57] ABSTRACT

Normal alkanes containing from six to 16 carbon atoms are selectively dehydrogenated to mono-alkenes and side reactions are minimized by contacting a hydrocarbon feedstock with a noble metal catalyst supported on a lithiated synthetic mordenite in the presence of hydrogen under appropriate dehydrogenation conditions.

8 Claims, No Drawings

DEHYDROGENATION PROCESS OVER PLATINUM ON LITHIATED MORDENITE

BACKGROUND OF THE INVENTION

This invention relates to the dehydrogenation of normal alkanes to normal alkenes. More specifically, it relates to the dehydrogenation of $C_6$ to $C_{16}$ alkanes over a catalyst comprising a platinum group noble metal supported on a lithiated synthetic mordenite.

DESCRIPTION OF THE PRIOR ART

Many catalysts and processes have been proposed for the dehydrogenation of saturated hydrocarbons. Among the catalysts suggested have been those comprising noble metals such as platinum and palladium and a support or carrier such as alumina, silica and combinations thereof. There are many serious problems inherent in such processes especially when higher paraffins such as those having from six to 16 carbon atoms are catalytically dehydrogenated. Ideally, paraffins are dehydrogenated to monoolefins. In practice, however, this reaction must compete with a variety of undesirable side reactions. Firstly, some of the paraffins are totally dehydrogenated to carbon, which deposits on the catalyst, thereby causing a decrease in catalyst activity and forcing periodic premature regeneration. Secondly, undesired dienes and polyenes are formed. Thirdly, cracking and skeletal isomerization take place yielding undesired products; and fourthly, with six-carbon and higher paraffins dehydrocyclization and aromatization occur.

A variety of catalytically active components and catalyst supports have been proposed to reduce the quantity of byproducts produced and thereby enhance the selectivity of the dehydrogenation to desired monoolefins. Prior art catalysts have generally consisted of one or more metallic components from the metals of groups VIB and VIII of the Periodic Table. Suitable catalytic composites have been found to include chromium, tungsten, molybdenum, iron, cobalt, nickel, platinum, palladium, iridium, ruthenium, rhodium, osmium and various compounds thereof. These metallic components are generally composited with a carrier selected from inorganic oxides such as silica, magnesia, thoria, titania and certain aluminas.

Notwithstanding the wide variety of metals and supports used heretofore, certain types of catalysts have been avoided as unsuitable. As a general rule acidic catalysts have not been used since acid catalysts promote isomerization, aromatization and cracking. Therefore, acidic supports such as silica-alumina and acidic metal-support combinations such as tin on alumina have been avoided. U.S. Pat. No. 3,291,755 issued to Haensel et al. discloses the use of platinum on lithiated alumina with arsenic, antimony and bismuth as specific catalytic promoters. U.S. Pat. No. 3,527,836 issued to Turner et al. discloses the use of a platinum group metal ion exchanged onto the external surface of small pore molecular sieves having a pore size equal to or less than that of a 5 A type sieve, i.e., about 5 Angstroms (A).

SUMMARY OF THE INVENTION

It has now been discovered that selective dehydrogenation of normal alkanes to mono-alkenes can be accomplished with a catalyst comprising a platinum group metal supported on a molecular sieve having a pore size of about 7 A. According to the present invention $C_{6-16}$ normal alkanes are dehydrogenated to normal alkenes by contacting the alkane with a catalyst in the presence of hydrogen at a temperature in the range of about 400°–650°C under dehydrogenation conditions, said catalyst comprising from about 0.05–2%w of a platinum group noble metal on a lithiated synthetic mordenite support containing from about 0.01–1.5%w lithium. Improved results are obtained when the noble metal is incorporated into the lithiated mordenite by impregnation and the composite is calcined at about 550°C.

DETAILED DESCRIPTION

Because of equilibrium limitations the dehydrogenation of paraffins to olefins of the same carbon number must be carried out at relatively high temperatures. For example, the limit of conversion of undiluted normal dodecane to mixed dodecenes is about 40%w at 450°C, and is about 65%w at 500°C. At these temperatures reactions producing cracked products or aromatics can become dominant. Consequently, a highly selective catalyst over which the cracking and dehydrocyclization reactions have been greatly reduced is most desirable.

Molecular sieves having a pore size smaller than 5 A have been considered particularly desirable supports because the pores are too small to permit the passage of aromatic molecules. Thus, an aromatic molecule, if formed at an interior metal site, must either equilibrate to a normal compound or be deposited as coke.

We have now discovered that by using a catalyst having a hydrogenation metal function supported within a lithiated mordenite the undesirable formation of aromatics and coke during paraffin dehydrogenation is greatly reduced. This shape-selective effect is attributed to steric inhibition to cyclization. For example, at 450°C, one WHSV, and a 1:1 molar ratio of hydrogen to dodecane, platinum supported on either amorphous alumina or silica-alumina yields over 6%v aromatics, while a lithiated mordenite supported platinum catalyst yields less than 1%v aromatics, and at a lower coke level than either of the two amorphous catalysts. It is believed that by placing platinum in the small symmetrical channels of a lithiated mordenite there is considerable more stearic inhibition to cyclization than to dehydrogenation. It is this inhibition that is thought to cause the dramatic lowering of the level or aromatic and coke formation. The dimensions of the space surrounding the active catalytic sites are critical. In changing from lithiated mordenite having maximum open channels of about 7 A in diameter to a calcium-A zeolite having cavities about 12 A in diameter the amount of cyclization, as measured by combined aromatic and coke production, increases significantly.

Lithiated mordenite catalyst support can be prepared by mixing a sodium form of mordenite such as sodium Zeolon with a solution of lithium nitrate and rolling the mixture overnight. Any water soluble lithium salt is suitable. The mixture is then filtered, washed with water, dried overnight at 120°C and calcined for about 3 hours at 550°C. The lithium solution concentration is such that from 0.01–1.5%w lithium is incorporated into the synthetic mordenite support.

The catalytically active metal employed in the process of the invention comprises a minor amount, i.e., from about 0.05–2%w, of a platinum group noble metal. Platinum is the preferred noble metal.

The method of incorporating noble metal into the support and the temperature at which the catalyst is calcined have been found to have a significant effect on the activity and selectivity of the finished catalyst. Impregnated catalysts are preferred over those prepared by ion-exchange. The increased selectivity of an impregnated lithium mordenite supported catalyst as compared to a catalyst prepared by ion exchange can be rationalized as follows, but applicants do not consider the explanation limiting. For example, during ion exchange, for every $Pt(NH_3)_4^{++}$ ion taken up, two non-reducible alkali metal ions ($A^+$) are removed as in equation (1).

$$2A^+_{zeolite} + Pt(NH_3)_4^{++}{}_{solution} \rightarrow (Pt(NH_3)_4^{++}{}_{zeolite} + 2A^+_{solution} \quad (1)$$

At the reduction step, the platinum is reduced but, due to the loss of alkali metal during the exchange step, acid sites are formed as in equation (2).

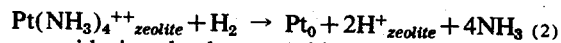

$$Pt(NH_3)_4^{++}{}_{zeolite} + H_2 \rightarrow Pt_0 + 2H^+{}_{zeolite} + 4NH_3 \quad (2)$$

These acid sites lead to cracking activity and consequently reduced selectivity. A catalyst so made would require neutralization by addition of alkali or alkaline earth ions or volatile bases prior to use. During impregnation, however, there is no loss on non-reducible alkali metal ions from the zeolite and therefore in the reduction step no protons need be retained to maintain electrical balance in the zeolite. Evidently the sodium form of the zeolite itself has some cracking activity since considerable cracking occurs even in the absence of acid sites.

The effect of calcination temperature is more difficult to explain. However, it has been observed that the selectivity of lithiated mordenite based impregnated catalysts is greatly reduced when the calcination temperature is lowered from 550° to 400°C. The preferred calcination temperature range is from about 500°–600°C, with a temperature of 550°C being especially suitable.

The catalyst of the invention is ordinarily used in granular or pelleted form in a fixed bed. Fairly uniform particles of about one-sixteenth to about three-eighths inch in size are satisfactory. If desired the dehydrogenation may be effected with finely divided catalysts to provide a fluidized catalytic process.

Dehydrogenation of paraffins to olefins utilizing the catalyst of the invention is suitable carried out at a temperature in the range from about 400°–650°C, and preferably from about 450°–550°C. In general the pressure is relatively low and can be in the range from a sub-atmospheric pressure of about 0.1 atmosphere (atm) to an elevated pressure of about 3 atm or more. Preferred pressures are in the range from about 0.3 atm to 2 atm. Weight hourly space velocities can vary over a considerable range such as from about 0.1 to about 20, but preferably will be from about 1 to 5.

There is a net production of hydrogen in the dehydrogenation reaction. Nevertheless it appears that the presence of added hydrogen is beneficial to catalyst stability. The molar ratio of hydrogen to hydrocarbon can vary from as low as about 0.1:1 to as high as 5:1, although lower and higher ratios can be used if desired. Recycle hydrogen can also be used.

While paraffins which are dehydrogenated by the process of the invention comprise normal alkanes ranging from $C_6$–$C_{16}$ individually or in a mixture, the process of the invention is particularly suitable for paraffins having a carbon range from $C_{10}$–$C_{14}$. The paraffins can also be admixed with other hydrocarbons. In this invention paraffins are selectively dehydrogenated to corresponding monoolefins with a minimum of aromatic and coke production. For example, normal dodecane is converted to normal dodecene. Recovery of olefins from the dehydrogenation zone effluent is effected by suitable means known in the art.

The following examples illustrate the process of the invention and its advantages but are not necessarily considered to be limitations thereon. In these examples $C_{12}$ olefins means the sum of $C_{12}$ mono-, di- and tri-olefins. Conversion is the percentage of n-dodecane converted to other materials. Yield is the weight percent of total $C_{12}$ olefins basis n-dodecane feed. Selectivity, percent is 100 (yield)/conversion.

EXAMPLE I

This example demonstrates the advantages of catalysts of the invention over conventional platinum-alumina catalysts.

A lithium mordenite based catalyst (catalyst A) was prepared by exchanging sodium Zeolon[1](Tradename for Norton Company Mordenite.)(sodium mordenite) with 2 molar lithium nitrate solution in the ratio of about 10 mls of solution per gram of Zeolon and rolling the mixture overnight. The material was then filtered and the exchange step was repeated. The material was then again filtered, washed, dried overnight at 120°C and calcined overnight at 550°C. Platinum was then impregnated into the calcined support by dissolving 0.27 grams $Pt(NH_3)_4Cl_2$ (assay 55.1%w Pt) in 3 mls water and adding the solution dropwise to 20 grams of the lithiated mordenite while stirring. The composite was then dried overnight at 120°C and calcined 3 hours at 550°C. The finished catalyst contained 0.74%w platinum and 0.8%w lithium.

A conventional dehydrogenation catalyst was prepared by breaking Harshaw 0104 $Al_2O_3$ pellets into granules and screening to 10–20 mesh. This support was essentially a gamma-alumina having a surface area of about 100 m²/g. Platinum was incorporated into the alumina by placing 455 grams of the granules into an evaporating dish and gradually wetting the granules with 300 mls of a solution containing 15 mg Pt, as $Pt(NH_3)_4oh._2$, per ml while stirring. The moist granules were then dried at 120°C overnight. The catalyst was reduced with hydrogen while being heated to 450°C prior to use. The finished catalyst contained 1%w platinum.

These catalysts were then used to dehydrogenate normal dodecane in a standard isothermal micro-reactor. Both catalysts were reduced at 550°C for 30 minutes before introduction of the feed. Test conditions were 450°C; weight hourly space velocity = 1; pressure = 1 atmosphere; hydrogen to normal dodecane ratios of 1 and 3; and a feed rate of 3.3 grams per hour. The unit was operated for 2 hours for stabilization and a weighed liquid sample was collected in a trap, cooled with dry ice, during the third hour of operation. The total liquid product was analyzed by both gas-liquid chromatography and mass spectrometry with results as shown in Table 1.

TABLE 1

| Catalyst | Conventional Pt/Al$_2$O$_3$ | A Pt/Li-Mord. | Conventional Pt/Al$_2$O$_3$ | A Pt/Li-Mord. |
|---|---|---|---|---|
| H2/oil ratio (molar) | 3 | 3 | 1 | 1 |
| TLP Analysis (%w Normalized) | | | | |
| <C$_{12}$ | 3.3 | 0.8 | 2.3 | 0.0 |
| C$_{12}$ Paraffin | 79.9 | 83.2 | 76.1 | 86.6 |
| C$_{12}$ Olefins | 12.3 | 14.2 | 15.5 | 12.5 |
| C$_{12}$ Aromatic | 4.5 | 1.9 | 6.1 | 0.9 |
| Conversion, %w | 20.1 | 16.8 | 23.9 | 13.4 |
| Yield, %w | 12.3 | 14.2 | 15.5 | 12.5 |
| Selectivity, % | 61 | 85 | 65 | 93 |
| Carbon on Catalyst (%w basis feed) | 0.20 | 0.07 | 0.36 | 0.04 |

The total production of C$_{12}$ aromatics plus coke over the Pt/Al$_2$O$_3$ catalyst at 3 and 1 hydrogen/oil molar ratios was 4.7%w and 6.5%w, respectively. The corresponding values for the platinum on lithium mordenite (Catalyst A) were 2.0%w and 0.9%w, respectively.

EXAMPLE II

This example demonstrates that improved dehydrogenation results are realized by incorporating the platinum into the support by impregnation instead of by ion exchange.

A lithium mordenite base for Catalyst B was prepared as follows: 117.3 g sodium Zeolon (sodium mordenite) was mixed with a solution of 342 grams LiNO$_3$ in 2,000 mls water and rolled overnight. The material was then filtered, washed with water, dried overnight at 120°C and calcined for 3 hours at 550°C. Platinum was ion exchanged into the support by mixing 50.5 g of the lithium mordenite base with a solution of 0.67 g Pt(NH$_3$)$_4$Cl$_2$ (assay 55.1%w Pt) in 500 mls of 2 molar LiNO$_3$. The mixture was rolled for about 60 hours (usually overnight), filtered and washed with water, dried overnight at 120°C and calcined for 3 hours at 550°C. The finished catalyst contained 0.73%w platinum and 0.8%w lithium.

Catalyst B was compared with Catalyst A of Example I using the same feed and operating conditions of Example I at a single hydrogen to normal dodecane molar ratio of 3. The results of these tests are shown in Table 2.

TABLE 2

| Catalyst | A | B |
|---|---|---|
| Pt Incorporation Method | Impregnation | Ion-Exchange |
| TLP Analysis (%w normalized) | | |
| <C$_{12}$ | 0.8 | 34.8 |
| C$_{12}$ Paraffin | 83.2 | 63.0 |
| C$_{12}$ Monoolefins | 12.3 | 1.5 |
| C$_{12}$ Diolefins | 1.5 | 0.3 |
| C$_{12}$ Triolefins | 0.4 | 0.0 |
| C$_{12}$ Aromatics | 1.9 | 0.4 |
| Conversion, %w | 16.8 | 37.0 |
| Yield, %w | 14.2 | 1.8 |
| Selectivity, % | 85 | 5 |
| Carbon on Catalyst (%w basis feed) | 0.07 | 1.43 |

The lower conversion to materials having fewer than 12 carbon numbers, the lower carbon content on the catalyst and the improved yield and selectivity of the impregnated catalyst are readily apparent. However, we do not mean to imply that catalysts giving the advantages of our invention can be made only by impregnation. By subsequent neutralization of acidity a satisfactory catalyst might be prepared by ion exchange. But impregnation is a simple procedure.

EXAMPLE III

This example demonstrates that improved dehydrogenation results are realized by calcining an impregnated catalyst at a temperature of about 550°C.

A lithium mordenite catalyst support was prepared in the same manner as for Example I except that the support was calcined overnight at 400°C instead of 550°C. Platinum was impregnated into the support by dissolving 0.27 grams Pt(NH$_3$)$_4$Cl$_2$ (assay 55.1%w Pt) in 3 mls water and the solution was added dropwise to 20 grams of the lithium mordenite support. The composite (catalyst C) was then dried overnight at 120°C and calcined for 3 hours at 400°C. The finished catalyst contained 0.64%w platinum and 0.8%w lithium.

This catalyst was compared with catalyst A of Example I using the same feed and operating conditions except that a single hydrogen/dodecane molar ratio of 3 was employed. The results of these tests are shown in Table 3.

TABLE 3

| Catalyst | A | C |
|---|---|---|
| Calcination Temp., °C | 550 | 400 |
| TLP Analysis (%w normalized) | | |
| < C$_{12}$ | 0.8 | 16.6 |
| C$_{12}$ Paraffin | 83.2 | 75.4 |
| C$_{12}$ Monoolefins | 12.3 | 5.9 |
| C$_{12}$ Diolefins | 1.5 | 1.2 |
| C$_{12}$ Triolefins | 0.4 | 0.3 |
| C$_{12}$ Aromatics | 1.9 | 0.7 |
| Conversion, %w | 16.8 | 24.6 |
| Yield, %w | 14.2 | 7.1 |
| Selectivity, %w | 85 | 29 |
| Carbon on Catalyst (%w basis feed) | 0.07 | 0.47 |

It is apparent from the lower conversion to material having fewer than 12 carbon numbers, from the lower carbon content on the catalyst and from the higher yield and selectivity, that a calcination temperature of 550°C is superior to that of 400°C.

EXAMPLE IV

This example demonstrates that improved dehydrogenation results are achieved by incorporating lithium into a mordenite support.

A lithium mordenite based catalyst (catalyst D) was prepared by exchanging sodium Zeolon (Na-mordenite) with 2 M LiNO$_3$ in a ratio of 10 mls of solution per gm of Zeolon and rolling the mixture 3 hours. The material was then filtered and the exchange step was repeated with rolling the mixture overnight. The material was then again filtered, washed, dried overnight at 120°C and calcined 3 hours at 550°C. Platinum was then impregnated into the calcined support by dissolving 0.45 gm Pt(NH$_3$)$_4$Cl$_2$ (assay 55.1%w Pt) in 7.5 mls water and adding dropwise to 20 gms of the lithiated mordenite. The composite was dried overnight at 120°C and calcined 3 hours at 550°C. The finished catalyst contained 1.0%w platinum and 0.8%w lithium.

A sodium mordenite catalyst (Catalyst E) was prepared by exchanging sodium Zeolon (Na Mordenite) with 2 molar sodium nitrate solution in the ratio of about 10 mls of solution per gm of Zeolon and rolling the mixture for 3 hours. The material was then filtered and the exchange step was repeated with rolling the mixture overnight. The material was then filtered, washed, dried overnight at 120°C and calcined 3 hours at 550°C. Platinum was then impregnated into the calcined support by dissolving 0.9 gm $Pt(NH_3)_4Cl_2$ (assay 55.1%w Pt) in 6 mls water and adding the solution dropwise to 50 gms of the sodium mordenite. The composite was then dried overnight at 120°C and calcined 3 hours at 550°C. The finished catalyst contained 1.0%w platinum and 5.3%w sodium.

These two catalysts were then used to dehydrogenate normal dodecane in a standard isothermal microreactor. Both catalysts were reduced at 300°C for one-half hour and at 460°C for 1 hour before introduction of the feed. Test conditions were 460°C; weight hourly space velocity = 3.7; pressure = 1 atmosphere; hydrogen to normal dodecane ratio of 3; and a feed rate of 3.3 gms per hour. The unit was operated for 2 hours for stabilization and a weighed liquid sample was collected in a trap, cooled with dry ice, during the third hour of operation. The total liquid product was analyzed by gas-liquid chromatography. No products having carbon numbers less than $C_{12}$ were detected from either run; however, the run with catalyst D (the lithiated catalyst) produced 9.8%w olefins, while the run with catalyst E (no lithium present) produced only 3.4%w olefins.

What is claimed is:

1. In a process for the selective dehydrogenation of $C_{6-16}$ normal alkanes to normal alkenes wherein the alkane is contacted with a catalyst in the presence of hydrogen at a temperature in the range of about 400°–650°C under dehydrogenation conditions, the improvement which comprises using a catalyst composite comprising from about 0.05–2%w of a platinum group noble metal on a lithiated synthetic mordenite support, said support having a lithium content from about 0.01–1.5%w.

2. The process of claim 1 wherein the noble metal is platinum.

3. The process of claim 1 wherein the platinum is incorporated into the lithiated synthetic mordenite by impregnation.

4. The process of claim 1 wherein the catalyst composite is calcined at about 550°C.

5. The process of claim 4 wherein the lithiated support is also calcined at 550°C.

6. The process of claim 1 herein the $C_{6-16}$ normal alkane is dodecane.

7. The process of claim 1 wherein the catalyst consists essentially of from about 0.05–2%w platinum incorporated by impregnation into a lithiated synthetic mordenite support which has been calcined at about 550°C and the composite is then calcined at about 550°C before use in a dehydrogenation process.

8. The process of claim 1 wherein the $C_{6-16}$ normal alkanes are admixed with other hydrocarbons.

* * * * *